US011287298B2

(12) United States Patent
Tschudin

(10) Patent No.: US 11,287,298 B2
(45) Date of Patent: Mar. 29, 2022

(54) MAGNETICALLY INDUCTIVE FLOWMETER

(71) Applicant: Endress+Hauser Flowtec AG, Reinach (CH)

(72) Inventor: Beat Tschudin, Reinach (CH)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 143 days.

(21) Appl. No.: 16/646,366

(22) PCT Filed: Aug. 16, 2018

(86) PCT No.: PCT/EP2018/072222
§ 371 (c)(1),
(2) Date: Mar. 11, 2020

(87) PCT Pub. No.: WO2019/052770
PCT Pub. Date: Mar. 21, 2019

(65) Prior Publication Data
US 2020/0271491 A1    Aug. 27, 2020

(30) Foreign Application Priority Data
Sep. 13, 2017    (DE) ...................... 10 2017 121 155.1

(51) Int. Cl.
*G01F 1/58* (2006.01)

(52) U.S. Cl.
CPC .............. *G01F 1/586* (2013.01); *G01F 1/584* (2013.01)

(58) Field of Classification Search
CPC .................................. G01F 1/586; G01F 1/584
See application file for complete search history.

(56) References Cited

U.S. PATENT DOCUMENTS

| 3,446,071 A | 5/1969 | Kolin et al. |
| 2014/0157910 A1* | 6/2014 | Voigt ...................... G01F 1/586 73/861.11 |
| 2017/0052047 A1 | 2/2017 | Profeta, Jr. et al. |

FOREIGN PATENT DOCUMENTS

| CN | 103827639 A | 5/2014 |
| DE | 3501768 A1 | 7/1986 |

(Continued)

OTHER PUBLICATIONS

Kornorientiertes Elektroblech und-band in schlussgeglühten Zustand; Deutsche Fassung EN 10107:2005, Oktober 2005, 16 pp.
(Continued)

*Primary Examiner* — Peter J Macchiarolo
*Assistant Examiner* — John M Royston
(74) *Attorney, Agent, or Firm* — Christopher R. Powers; Endress+Hauser(USA) Holding, Inc.

(57) ABSTRACT

Disclosed is a magnetically inductive flowmeter comprising: a measuring tube; a magnet system having a coil system comprising a coil and a coil core within the coil, wherein the magnet system produces a magnetic field perpendicular to the measuring tube; at least two measuring electrodes for sensing an electrical voltage induced in the medium; and a field guide to guide the magnetic field between a side of the coil far from the measuring tube and a side of the measuring tube far from the coil, wherein the magnet system has a pole shoe to lead the magnetic field between the measuring tube and the field guide, wherein the pole shoe has a folded sheet metal piece, the field guide has a folded sheet metal piece, and the pole shoe and the field guide are magnetically and mechanically in contact in an interior of the first coil.

13 Claims, 5 Drawing Sheets

(56) References Cited

FOREIGN PATENT DOCUMENTS

| | | |
|---|---|---|
| DE | 19958285 A1 | 6/2001 |
| DE | 102008035740 A1 | 2/2010 |
| DE | 202014103426 U1 | 8/2014 |
| JP | 04128613 A | 4/1992 |
| JP | 04128613 A | 4/2004 |
| JP | 2004325369 A | 11/2004 |

OTHER PUBLICATIONS

Kaltgewalztes nicht kornorientiertes Elektroblech und-band im schlussgeglühten Zustand; Deutsche Fassung EN 10106:2007, Nov. 2007, 22 pp.

\* cited by examiner

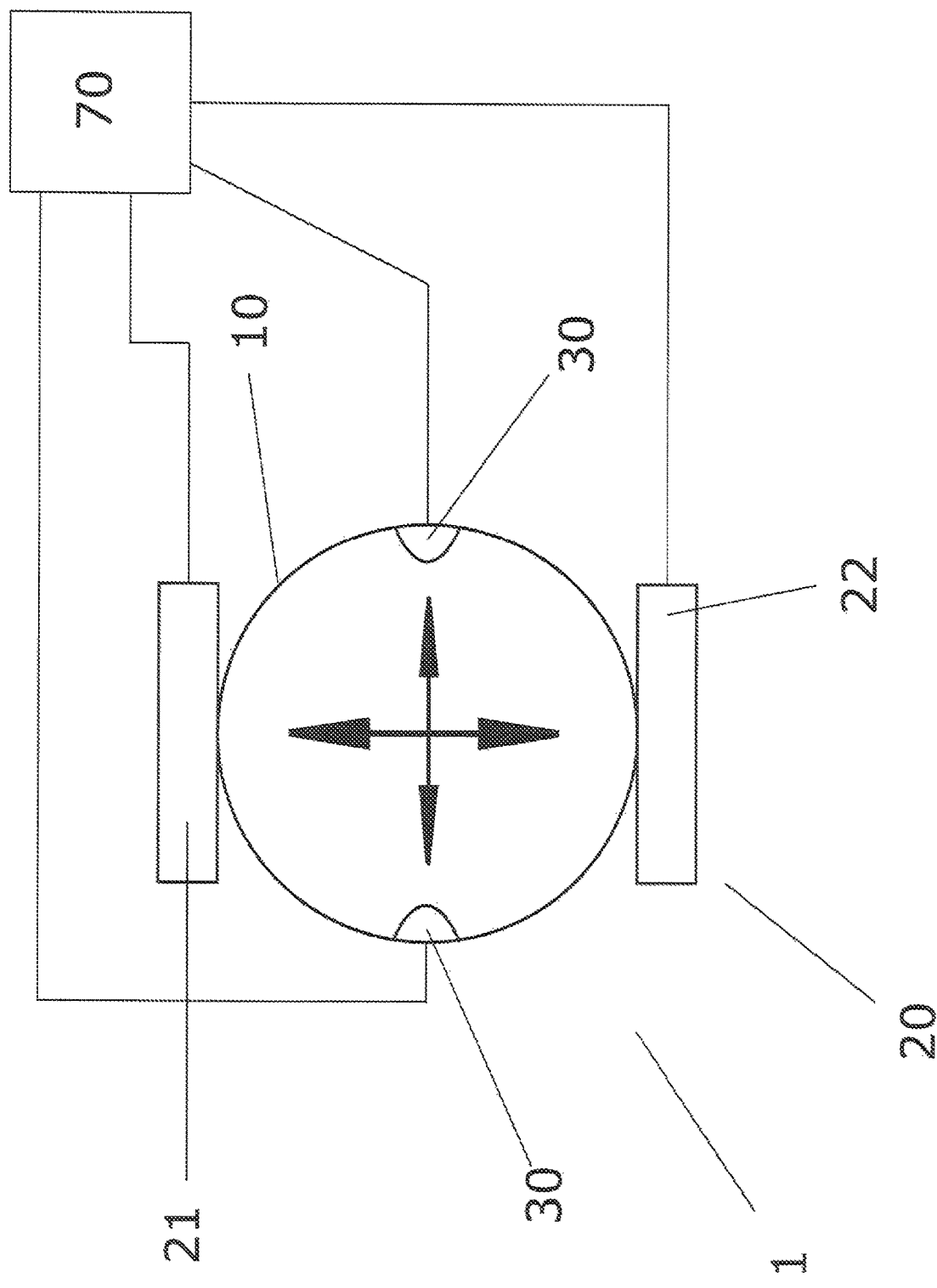

MAGNETICALLY INDUCTIVE FLOWMETER

CROSS-REFERENCE TO RELATED APPLICATIONS

The present application is related to and claims the priority benefit of German Patent Application No. 10 2017 121 155.1, filed on Sep. 13, 2017, and International Patent Application No. PCT/EP2018/072222, filed on Aug. 16, 2018, the entire contents of which are incorporated herein by reference.

TECHNICAL FIELD

The invention relates to a magnetically inductive flowmeter for measuring flow velocity, or volume flow, of a medium flowing through a measuring tube.

BACKGROUND

Magnetically inductive flowmeters have been in existence for a long time. The functional principle is based on the fact that there can be induced in electrically conductive media by means of a magnetic field a flow velocity dependent, electrical voltage, which can be evaluated for measuring flow velocity, or flow, of the medium.

Usually, magnetically inductive flowmeters include a measuring tube, a magnet system with two coil systems lying on opposite sides of the measuring tube for producing a magnetic field extending perpendicularly to a measuring tube axis, and at least two measuring electrodes arranged in or on the measuring tube for sensing the electrical voltage induced in the medium. In order to make the magnetic field outside of the measuring tube as independent of the environment of the flowmeter as possible, such a flowmeter includes a metallic field guide, which guides the magnetic field between the coil systems outside of the measuring tube.

The connecting of the field guide to the coil systems proves to be critical in such case, since a poor connection can significantly increase the magnetic resistance of the system formed by the magnet system and the field guide. This results in a lower magnetic field strength in the measuring tube and, thus, a worsened signal-noise ratio in the measurement of the induced electrical voltage. The state of the art, such as shown, for example, in DE202014103426U1, for example, equips coils with pole shoes, which pole shoes have a planar contact area for bearing or for clamping of the field guide. Small changes of the bearing pressure lead to large changes of the magnetic resistance.

SUMMARY

An object of the invention is to provide an improved connecting of the field guide to the magnet system.

The object is achieved by a magnetically inductive flowmeter as claimed in claim 1.

A magnetically inductive flowmeter of the invention for measuring flow velocity, or volume flow, of a medium flowing through a measuring tube comprises:

A measuring tube having a measuring tube axis;

a magnet system having a first coil and a first coil core arranged within the first coil, wherein the magnet system is adapted to produce a magnetic field, which extends perpendicularly to the measuring tube axis;

at least two measuring electrodes for sensing a flow dependent electrical voltage induced in the medium by the magnetic field, wherein the measuring electrodes are arranged in the or on the measuring tube and are adapted to sense the voltage capacitively or galvanically;

an electronic measuring/operating circuit for operating the magnet system as well as the measuring electrodes; and a field guide, which is adapted to guide the magnetic field between a side of the first coil far from the measuring tube and a side of the measuring tube far from the first coil, wherein the magnet system has a first pole shoe, which is adapted to lead the magnetic field between the measuring tube and the field guide, wherein the first pole shoe has at least one folded, pole shoe, sheet metal piece, and wherein the field guide has at least one folded, field guide, sheet metal piece, wherein the first pole shoe and the field guide are magnetically and mechanically in contact at least in an interior of the first coil, wherein the first pole shoe as well as the field guide at least partially form the first coil core in the interior of the first coil.

In an embodiment, a first, pole shoe, sheet metal piece has a number, n1, of pole shoe, sheet metal piece folds, which protrude at least partially into the interior of the first coil, and wherein a first, field guide, sheet metal piece has a first group of folds with a number, n2, of field guide, sheet metal piece folds, which protrude at least partially into the interior of the first coil, wherein a fold results in two adjoining plies, wherein the n2, field guide, sheet metal piece folds and the n1, pole shoe, sheet metal piece folds overlap, wherein:

if ni=1, then nj=2 and ni<=nj and nj<ni+2, with ni=(n1 or n2) and nj=(n2 or n1), wherein at least one, pole shoe, sheet metal piece fold is arranged between two, field guide, sheet metal piece folds and is in mechanical contact with such and/or wherein at least one, field guide, sheet metal piece fold is arranged between two, pole shoe, sheet metal piece folds and is in mechanical contact with such.

The forming of folds in contact with one another provides a good transfer of the magnetic field between pole shoe and field guide.

In an embodiment, a fold has a fold length along its two plies, wherein the mechanical contact between a field guide, sheet metal piece fold and a pole shoe, sheet metal piece fold extends over a region, which covers at least 60% and especially at least 70% and preferably at least 80% of a fold length of the pole shoe, sheet metal piece fold or a fold length of the field guide, sheet metal piece fold.

The fold length concerns, in such case, a region, in which two plies of a sheet metal piece are in contact with one another.

In an embodiment, the first, pole shoe, sheet metal piece has a first end, a second end as well as a central region, wherein the central region connects the first end with the second end, and wherein the at least one, pole shoe, sheet metal piece fold is produced by folding the central region, wherein the first pole shoe has a first securement, which is arranged between the measuring tube and the first, pole shoe, sheet metal piece and grips the first end as well as the second end, in each case at least partially, by means of at least one grip element, wherein the first securement is produced from a sheet metal piece.

The securement is adapted to hold the first end and the second end in a fixed position, in order to keep magnetic properties of the magnet system constant.

In an embodiment, the first end as well as the second end lie in a plane, and/or wherein the at least one grip element is a securement fold, which protrudes from a base of the first securement.

In an embodiment, turns of the coil are adapted to press the at least one, pole shoe, sheet metal piece fold as well as the at least one, field guide, sheet metal piece fold against one another in a cross sectional plane of the measuring tube.

In an embodiment, the magnet system includes at least one pressing mechanism, which is adapted to press the at least one, pole shoe, sheet metal piece fold as well as the at least one, field guide, sheet metal piece fold against one another in a cross sectional plane of the measuring tube, wherein the pressing mechanism has a force interlocking or shape interlocking connection, wherein the connection has especially at least one element from the following list:

clamp, potting material, adhesive bond, rivet, screw.

In an embodiment, the magnet system includes on a first coil far side of the measuring tube a second coil having a second coil core and a second pole shoe, which correspond to the first coil as well as the first coil core as well as the first pole shoe and especially are equally embodied, wherein the field guide is adapted to guide the magnetic field between a measuring tube far side of the first coil and a measuring tube far side of the second coil, wherein the second pole shoe is adapted to lead the magnetic field between the measuring tube and the field guide.

In an embodiment, the first, field guide, sheet metal piece includes a second group of folds, wherein the second pole shoe as well as the second group of folds at least partially form the second coil core in an interior of the second coil.

In an embodiment, the field guide includes a second, field guide, sheet metal piece, on which the second group is arranged.

In an embodiment, the first, field guide, sheet metal piece as well as the second, field guide, sheet metal piece have two contact areas, by means of which the field guide, sheet metal pieces are connected magnetically as well as mechanically.

In an embodiment, the measuring electrodes define a transverse axis, wherein the contact areas are intersected by the transverse axis or at least partially surround the transverse axis.

In an embodiment, the field guide includes at least two reception openings, which are adapted to accommodate the measuring electrodes or measuring electrode contacts.

In an embodiment, the field guide comprises at least one electrical sheet metal piece conforming to the standard DIN EN 10106 of November 2007 or the standard DIN EN10107 of October 2005.

BRIEF DESCRIPTION OF THE DRAWINGS

The invention will now be described in greater detail based on schematic examples of embodiments shown in the appended drawing, the figures of which show as follows.

FIG. 5 shows an operation of a flowmeter of the present disclosure.

DETAILED DESCRIPTION

Figure 1:
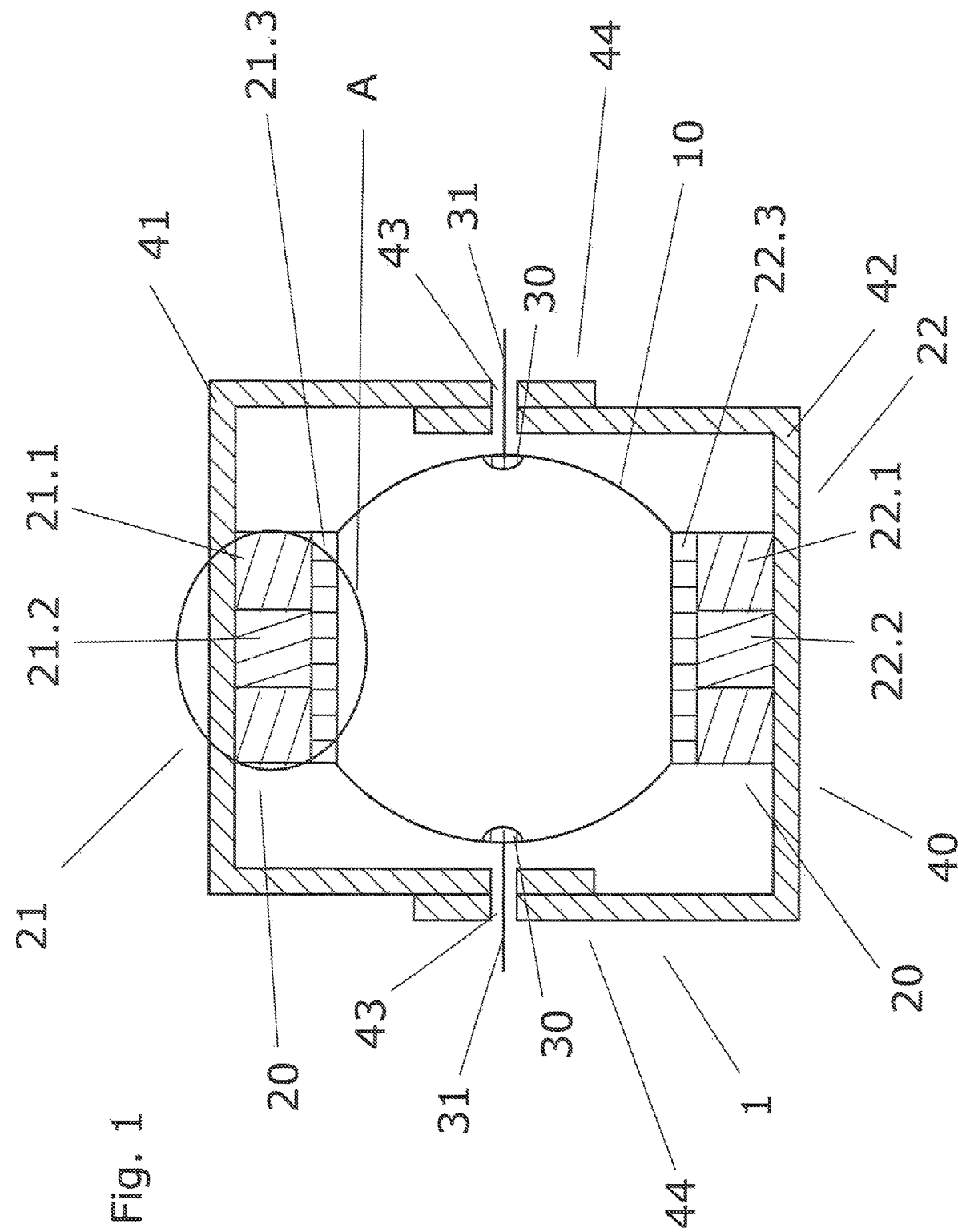
FIG. 1 shows a cross section of a magnetically inductive flowmeter of the present disclosure.

FIG. 1 shows a schematic cross section of a magnetically inductive flowmeter 1 of the invention, including a measuring tube 10, a magnet system 20 having a first coil system 21 and a second coil system 22, measuring electrodes 30, and a field guide 40. The first coil system includes, in such case, a first coil 21.1 and a first pole shoe 21.3, wherein a first coil core 21.2 is arranged in the interior of the first coil. Equivalently, the second coil system 22 includes a second coil 22.1 and a second pole shoe 22.3, wherein a second coil core 22.2 is arranged in the interior of the second coil. The magnet system is adapted to produce a magnetic field, which is perpendicular to a measuring tube axis. The pole shoes lie, in such case, against the measuring tube and are adapted to lead the magnetic field between the measuring tube and the field guide. Field guide 40 is adapted to lead the magnetic field between the coil systems outside of the measuring tube 10. The field guide includes a first, field guide, sheet metal piece 41 and a second, field guide, sheet metal piece 42, which are connected magnetically and mechanically together in contact areas 44. Alternatively, the field guide can also have only one field guide, sheet metal piece, wherein ends of the field guide, sheet metal piece are connected magnetically and mechanically together in one contact region. The measuring electrodes 30 are connected galvanically with the medium flowing through the measuring tube; they can, however, also be coupled capacitively with the medium. Measuring electrode contacts 31 are led through reception openings 43 to an electronic measuring/operating circuit shown in FIG. 5.

Figure 2:
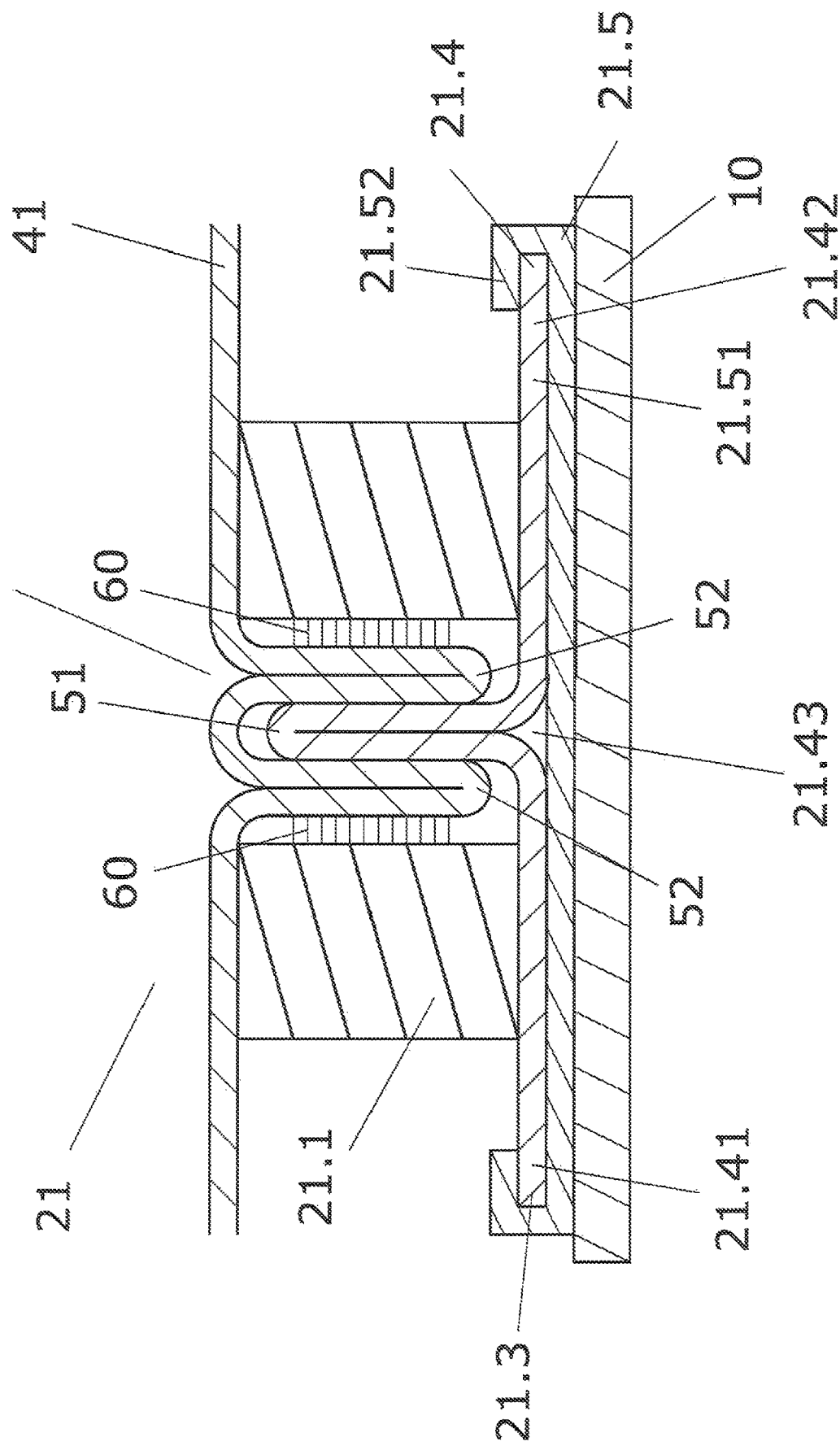
FIG. 2 shows an enlarged section of a coil core shown in FIG. 1.

FIG. 2 shows a detailed enlargement of the first coil system 21 indicated in FIG. 1 with the letter A, wherein the first, field guide, sheet metal piece 41 has two, field guide, sheet metal piece folds 52, and wherein the first pole shoe 21.3 has a first, pole shoe, sheet metal piece 21.4 having a pole shoe, sheet metal piece fold 51, which is arranged between the two, field guide, sheet metal piece folds and contacts such mechanically and magnetically. The folds are pressed against one another by a pressing mechanism 60, in order to maintain the contacts permanently and stably. The pressing mechanism includes a force transmitting connection, wherein the force transmitting connection has especially at least one element from the following list: clamp, potting material, adhesive bond, rivet, screw. Alternatively or supplementally, the first coil 21.1 can be adapted such that it acts as the pressing mechanism 60. The folds of the pole shoe as well as the field guide form, thus, the first coil core 21.2. The number of field guide, sheet metal piece folds as well as the number of pole shoe, sheet metal piece folds are not limited by the example shown here. Possible configurations are explained in greater detail in the description of FIG. 3. The pole shoe, sheet metal piece 21.4 includes a first end 21.41, a second end 21.42 and a central region 21.43, in which the at least one, pole shoe, sheet metal piece fold is located. For stabilizing and securing the first end as well as the second end, the first pole shoe includes a first securement 21.5, which secures the first end as well as the second end by means of at least one grip element 21.52, wherein the grip element protrudes from a base 21.51 of the first securement. The first securement is, in such case, arranged between the measuring tube and the first, pole shoe, sheet metal piece 21.5 and provides a good magnetic contact between the first pole shoe and the measuring tube. Possible embodiments of the at least one grip element are more exactly described in FIG. 4. The features of the first coil system as well as the field guide shown in FIG. 2 hold correspondingly also for the second coil system having a second, pole shoe, sheet metal piece and a second securement.

Figure 3:
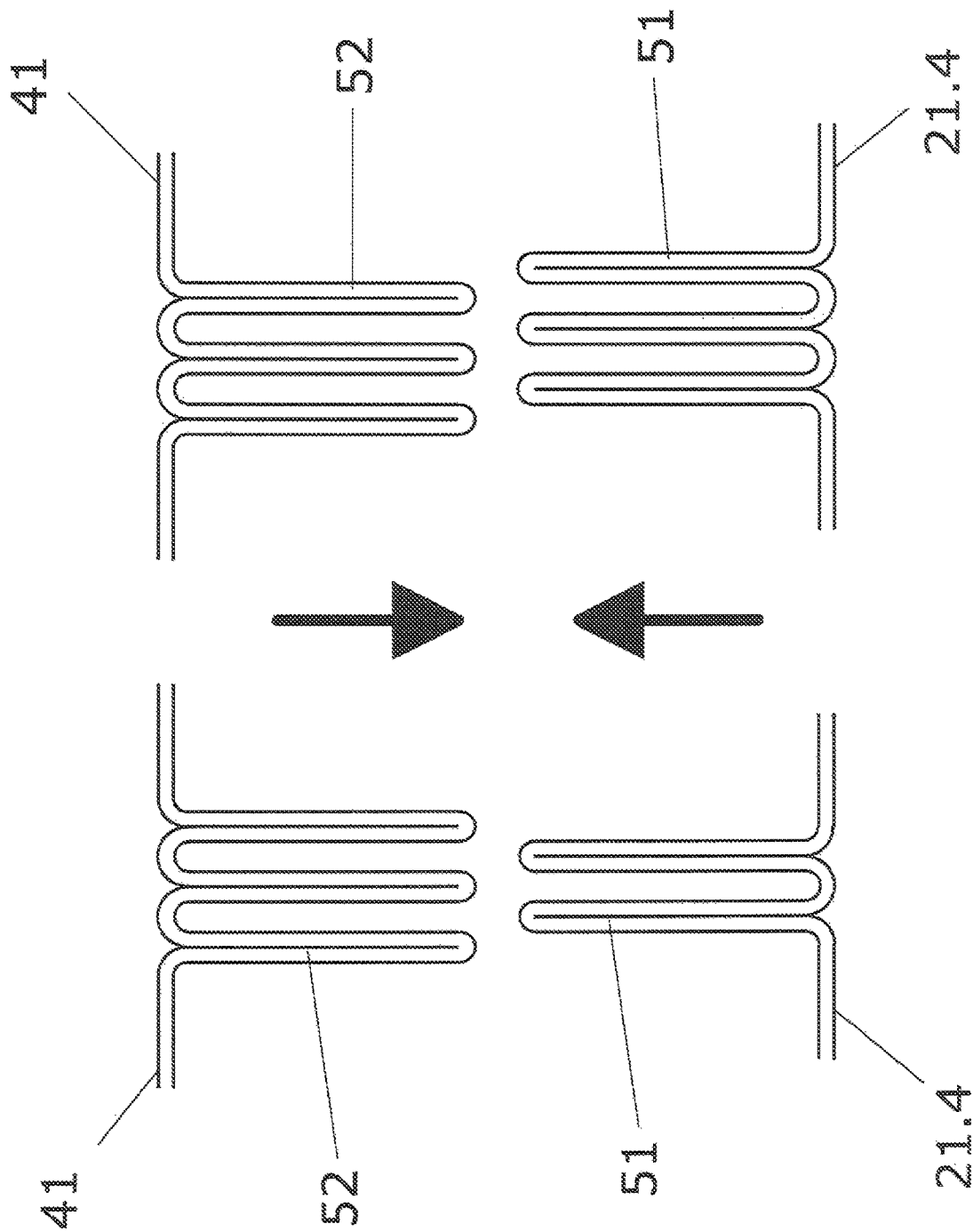
FIGS. 3 a), 3 b) show other embodiments of a coil core of the invention.

FIG. 3 a) shows an embodiment of the first, pole shoe, sheet metal piece 21.4, which is contactable with the first, field guide, sheet metal piece 41 when they are moved together as shown by the arrows. In the case shown here, the field guide, sheet metal piece 41 has n2=3 field guide, sheet metal piece folds 52, and the pole shoe, sheet metal pieces 21.4 has n1=n2−1=2 pole shoe, sheet metal piece folds, wherein the field guide, sheet metal piece and the pole shoe, sheet metal pieces are so led together that each of the pole shoe, sheet metal piece folds is arranged between two, field guide, sheet metal piece folds. Alternatively, the number of pole shoe, sheet metal piece folds can be greater by 1 than the number of field guide, sheet metal piece folds, wherein for engagement the above holds correspondingly. In general, n1 and n2 are, in each case, greater than or equal to 1.

FIG. 3 b) shows a situation corresponding to the embodiment shown in FIG. 3 a), wherein, in FIG. 3 b), the number n2 of field guide, sheet metal piece folds 52 equals the number n1 of pole shoe, sheet metal piece folds, this having the result that after bringing the first, field guide, sheet metal piece 41 and the first, pole shoe, sheet metal piece 21.4 together, each has an outer fold, which is not arranged between two folds. In such case, n1=n2=greater than 1.

The features of the first, pole shoe, sheet metal piece 21.4 as well as the first, field guide, sheet metal piece illustrated in FIGS. 3 a) and 3 b) hold correspondingly also for the second coil system having the second, pole shoe, sheet metal pieces and the second securement, wherein the numbers n1 and n2 of the second coil system correspond not necessarily, however, advantageously, to the numbers n1 and n2 of the first coil system.

Figure 4:
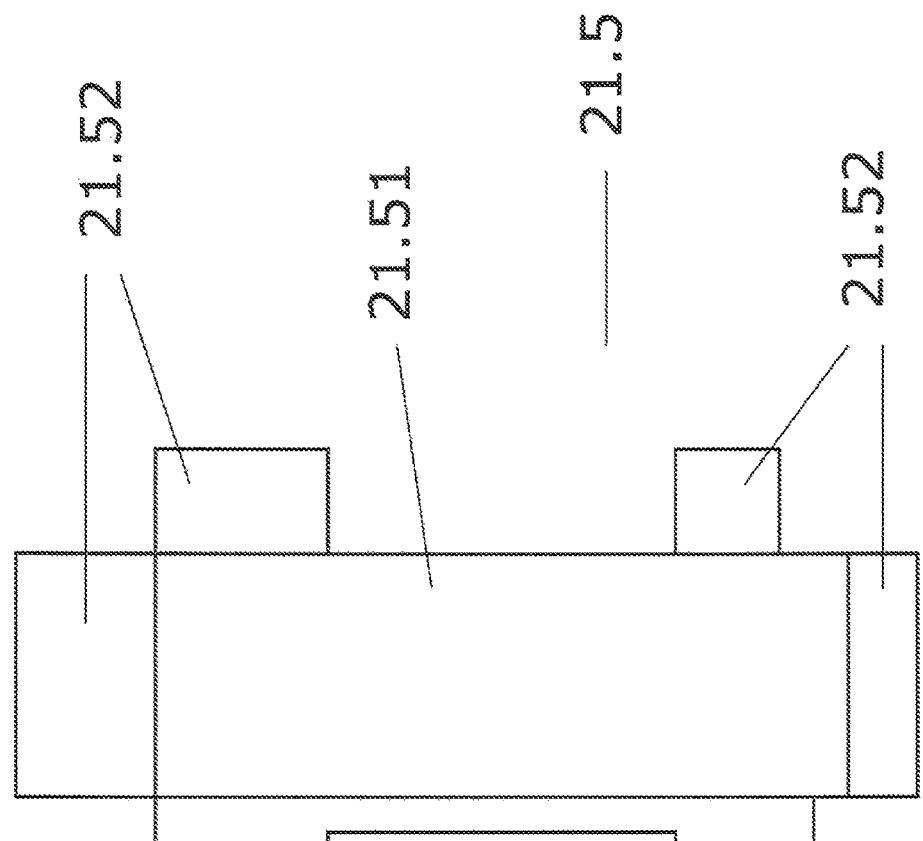
FIG. 4 shows different options for embodiment of a first securement.

FIG. 4 shows a plan view of the first, pole shoe, sheet metal piece 21.4 with the first end 21.41, the second end 21.42 and the central region 21.43, as well as a plan view of the first securement 21.5 with the base 21.51 as well as a plurality of examples of grip elements 21.52. In application of the first, pole shoe, sheet metal piece on the base of the first securement, the grip elements are formed around the first end 21.41, and the second end 21.42, so that the ends are secured by at least one grip element. For example, a grip element can be arranged on an end of the base. A grip element can also be arranged on a side of the base and on an end of the first, pole shoe, sheet metal piece. A grip element can also be arranged mostly along a side of the base and secure the two ends of the first, pole shoe, sheet metal piece. Advantageously, different grip elements do not overlap one another after the folding. It is advantageous in the case of a system of exclusively lateral grip elements when the first end 21.41 as well as the second end 21.42 are secured from both sides.

FIG. 5 shows, schematically, the construction of a magnetically inductive flowmeter 1, which has a measuring tube 10 with a measuring tube axis. A magnet system 20 having a first coil system 21 and a second coil system 22 is adapted to provide a magnetic field (vertical arrows) extending perpendicularly to the measuring tube axis, in order to induce in the medium a flow dependent as well as magnetic field dependent, electrical voltage (horizontal arrows) extending perpendicularly to the magnetic field. Two measuring electrodes 30 are provided to sense the electrical voltage. An electronic measuring/operating circuit 70 is adapted to evaluate the electrical voltage and to provide a flow dependent, measured variable, as well as to operate the magnet system 20. For reasons of perspicuity, the field guide shown in FIGS. 1 and 2 is not shown in FIG. 5.

The invention claimed is:

1. A magnetically inductive flowmeter for measuring flow velocity, or volume flow, of a medium flowing through a measuring tube, the magnetically inductive flowmeter comprising:
    a measuring tube having a measuring tube axis;
    a magnet system including a first coil system including a first coil and a first coil core arranged within the first coil, wherein the magnet system is adapted to produce a magnetic field perpendicular to the measuring tube axis;
    at least two measuring electrodes for sensing a flow dependent electrical voltage induced in the medium by the magnetic field, wherein the at least two measuring electrodes are arranged in or on the measuring tube and are adapted to sense the voltage capacitively or galvanically;
    an electronic measuring/operating circuit for operating the magnet system and the at least two measuring electrodes; and
    a field guide adapted to guide the magnetic field between a side of the first coil far from the measuring tube and a side of the measuring tube far from the first coil,
    wherein the magnet system further includes a first pole shoe adapted to lead the magnetic field between the measuring tube and the field guide,
    wherein the first pole shoe includes a first folded sheet metal piece and the field guide includes a first folded sheet metal piece,
    wherein the first pole shoe and the field guide are magnetically and mechanically in contact at least in an interior of the first coil,
    wherein the first pole shoe and the field guide at least partially form the first coil core in the interior of the first coil,
    wherein the first pole shoe sheet metal piece has a number, n1, of folds that protrude at least partially into the interior of the first coil,
    wherein the first field guide sheet metal piece has a first group of folds with a number, n2, of folds that protrude at least partially into the interior of the first coil,
    wherein each fold results in two adjoining plies,
    wherein the field guide sheet metal piece folds and the pole shoe sheet metal piece folds overlap, wherein:
        if ni=1, then nj=2, else ni<=nj<ni+2,
        wherein ni=(n1 or n2) and nj=(n2 or n1), and
    wherein at least one of the pole shoe sheet metal piece folds is arranged between two of the field guide sheet metal piece folds and in mechanical contact with the two field guide sheet metal piece folds and/or at least one of the field guide sheet metal piece folds is arranged between two of the pole shoe sheet metal piece folds and in mechanical contact with the two pole shoe sheet metal piece folds.

2. The magnetically inductive flowmeter as claimed in claim 1,
    wherein a fold has a fold length along its two plies, and
    wherein the mechanical contact between a field guide sheet metal piece fold and a pole shoe sheet metal piece fold extends over a region that covers at least 60% of a fold length of the pole shoe sheet metal piece fold or a fold length of the field guide sheet metal piece fold.

3. The magnetically inductive flowmeter as claimed in claim 1, wherein the pole shoe sheet metal piece has a first end, a second end, and a central region connecting the first end with the second end, wherein the at least one pole shoe sheet metal piece fold is produced by folding the central region, wherein the first pole shoe has a first securement arranged between the measuring tube and the first pole shoe sheet metal piece and grips the first end and the second end, in each case at least partially, by means of at least one grip element, and wherein the first securement is produced from a sheet metal piece.

4. The magnetically inductive flowmeter as claimed in claim 3, wherein the first end and the second end lie in a plane, and/or wherein the at least one grip element is a securement fold that protrudes from a base of the first securement.

5. The magnetically inductive flowmeter as claimed in claim 1, wherein turns of the coil are adapted to press the at least one pole shoe sheet metal piece fold and the two field guide sheet metal piece folds against one another in a cross sectional plane of the measuring tube.

6. The magnetically inductive flowmeter as claimed in claim 1, wherein the magnet system further includes a pressing mechanism adapted to press the at least one pole shoe sheet metal piece fold and the two field guide sheet metal piece folds against one another in a cross sectional plane of the measuring tube, and wherein the pressing mechanism has a force interlocking or shape interlocking connection having at least one element from the following list: a clamp, a potting material, an adhesive bond, a rivet, and a screw.

7. The magnetically inductive flowmeter as claimed in claim 1, wherein the magnet system further includes on a first coil far side of the measuring tube a second coil system having a second coil with a second coil core and a second pole shoe that correspond to the first coil and the first coil core and the first pole shoe, wherein the field guide is adapted to guide the magnetic field between a measuring tube far side of the first coil and a measuring tube far side of the second coil, wherein the second pole shoe is adapted to lead the magnetic field between the measuring tube and the field guide, wherein the second pole shoe and the field guide are magnetically and mechanically in contact at least in an interior of the second coil, and wherein the second pole shoe and the field guide at least partially form the second coil core in the interior of the second coil.

8. The magnetically inductive flowmeter as claimed in claim 7, wherein the field guide sheet metal piece further includes a second group of folds, wherein the second pole shoe and the second group of folds at least partially form the second coil core in an interior of the second coil.

9. The magnetically inductive flowmeter as claimed in claim 7, wherein the field guide includes a second sheet metal piece on which the second group of folds is arranged.

10. The magnetically inductive flowmeter as claimed in claim 9, wherein the first field guide sheet metal piece and the second field guide sheet metal piece have two contact areas by which the two field guide sheet metal pieces are connected magnetically and mechanically.

11. The magnetically inductive flowmeter as claimed in claim 10, wherein the measuring electrodes define a transverse axis, wherein the contact areas are intersected by the transverse axis or surround the transverse axis.

12. The magnetically inductive flowmeter as claimed in claim 1, wherein the field guide includes at least two reception openings adapted to accommodate the measuring electrodes or measuring electrode contacts.

13. The magnetically inductive flowmeter as claimed in claim 1, wherein the field guide includes at least one electrical sheet metal piece.

\* \* \* \* \*